Patented Feb. 24, 1948

2,436,436

UNITED STATES PATENT OFFICE 2,436,436

DISAZO DYESTUFFS

Arthur Howard Knight and William Elliot Stephen, Blackley, Manchester, England, assignors to Imperial Chemical Industries Limited, a corporation of Great Britain No Drawing. Application May 6, 1943, Serial No. 485,928. In Great Britain May 6, 1942

1 Claim. (Cl. 260—185)

The present invention relates to the manufacture of new disazo dyestuffs and to their use in colouring animal fibres.

According to the invention we make new dyestuffs of the general formula

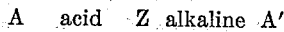

where A stands for a primary arylamine, being a nitroamine of the benzene or naphthalene series or an aminoacidylaniline, which may be further substituted but is devoid of sulphone, sulphonamide and hydroxyl groups, A' stands for an arylamine of the general formula

X—CO—NY—R—NH$_2$ and Z stands for a 1-amino-8-naphtholsulphonic acid having the 2- and 7-positions free. In the aforesaid general formula X—CO—NY—R—NH$_2$ R stands for a m- or p-phenylene residue which may carry simple azo dyestuff substituents, for example, methyl, methoxy or (except para to the NH$_2$ group) sulphonic groups, but contains no aryloxy substituent, X stands for a monochloro- or monobromo-alkyl radical having not more than three carbon atoms, and Y stands for hydrogen, alkyl (C$_1$ to C$_6$), cycloalkyl, aralkyl, alkoxyalkyl or aryl.

According to the invention disazo dyestuffs are manufactured by a process comprising diazotising a primary arylamine A, coupling one molecular proportion thereof in acid medium with a 1-amino-8-naphtholsulphonic acid Z to produce a monoazo compound, diazotising an arylamine A' and coupling one molecular proportion thereof in alkaline medium with the aforesaid monoazo compound, the symbols A, A' and Z having the meanings defined above.

Also according to the invention the new dyestuffs are used in colouring animal fibres, e. g., wool and silk.

The new dyestuffs dye wool from an acid bath in various shades of blue and black, affording dyeings of very good fastness to severe washing and sulphur stoving and good fastness to milling, potting, perspiration and light.

As examples of diazo components represented by the symbol A above which can be employed according to the invention there are mentioned o-, m- and p-nitro-anilines, o-chloro-p-nitroaniline, o-bromo-p-nitro-aniline, 5-nitro-2-anisidine, 4-nitro-2-toluidine, 5-nitro-1-aminonaphthalene, p-nitroaniline-o-sulphonic acid, m- and p-aminoacetanilides, 4-amino-1-N-ethylacetanilide (obtainable by acetylating 4-nitro-N-ethylaniline and reducing), 4-amino-1-N-cyclohexylacetanilide, 4'-amino-1'-N-ethylbenzanilide, 4-amino-1-N-β-chloropropionanilide, 4-amino-1-N-ethyl-ω-chloroacetanilide, 4-amino-2-N-ethyl-β-chloropropiontoluidide and 4-amino-1-N-cyclohexyl-ω-chloroacetanilide.

As examples of diazo components represented by the symbol A' above which can be used according to the invention there are mentioned:

4-amino-1-N-ethyl-omega-chloroacetanilide,
4-amino-1-N-isopropyl-omega-chloroacetanilide,
4-amino-1-N-n-butyl-omega chloroacetanilide,
4-amino-2-N-ethyl-omega-chloroacet-toluidide,
4-amino-2-N-ethyl-omega-bromopropion-toluidide,
3-amino-omega-chloroacetanilide-4-sulphonic acid,
2-amino-4-N-ethyl-omega-chloroacet-toluidide,
4-amino-2-N-ethyl-α-bromobutyryl-toluidine,
4-amino-2-N-ethyl-α-bromopropion-toluidide,
4-amino-2-N-ethyl-omega-chloropropiontoluidide,
4-amino-1-N-ethyl-omega-chloropropionanilide,
4-amino-1-N-ethyl-omega-bromopropionanilide,
4-amino-1-N-sec-butyl-omega-chloroacetanilide,
4-amino-omega-chloroacetanilide-3-sulphonic acid,
4-amino-2-N-ethyl-omega-chloroacetanisidide,
4-amino-1-N-n-butyl-omega-chloroacetanilide-2-sulphonic acid,
4-amino-1-N-ethyl-omega-bromoacetanilide,
4-amino-1-N-benzyl-omega-chloro-acetanilide,
4-amino-1-N-cyclohexyl-omega-chloroacetanilide,
5-amino-2-N-cyclohexyl-omega-chloroacet-toluidide,
3-amino-1-N-benzyl-omega-chloroacetanilide,
4-amino-2-N-benzyl-omega-chloroacet-toluidide,
4-amino-1-N-phenyl-omega-chloroacetanilide,
4-amino-1-N-cyclohexyl-omega-chloropropionanilide,
4-amino-1-N-cyclohexyl-omega-bromopropionanilide,
4-amino-1-N-cyclohexyl-α-bromopropionanilide,
4-amino-1-N-cyclohexyl-omega-bromo-acetanilide,
4-amino-2-N-benzyl-omega-chloro-acetanisidide,
4-amino-1-N-cyclohexyl-omega-chloroacetanilide-2-sulphonic acid,
3-amino-1-N-benzyl-omega-chloropropionanilide (obtainable by methods described in British Patent No. 544,409 or our U. S. Patent No. 2,346,492),
4-amino-1-N-β-ethoxyethyl-omega - chloroacetanilide (obtainable by acetylating N-β-ethoxyethaniline, nitrating, removing the acetyl group by hydrolysing, causing the resulting 4-nitro-1-N-β-ethoxyethylaniline to react with chloroacetyl chloride and reducing), and 4-amino-1-N-cyclohexyl-omega - chloroacetanilide-2-sulphonic acid (obtainable by chloroacetylating sodium 4-nitro-1-N-cyclohexylaniline-2-sulphonate and reducing).

As examples of coupling components represented by the symbol Z above which can be employed according to the invention there are mentioned 1-amino-8-naphthol-3:6- and 4:6-disulphonic acids, and 1-amino-8-naphthol-4- and -6 monosulphonic acids.

The invention is illustrated, but not limited, by the following examples in which the parts are by weight.

Example 1

22.6 parts of 4-amino-2-N-ethyl-omega-chloroacettoluidide are dissolved in a mixture of 400 parts of water and 25 parts of 36% hydrochloric acid and diazotised at 5–10° C. by the addition of a solution of 6.9 parts of sodium nitrite in 50 parts of water.

13.8 parts of p-nitroaniline are diazotised in 700 parts of water and 30 parts of 36% hydrochloric acid by the addition of 6.9 parts of sodium nitrite and to the resulting diazo solution is added with stirring a neutral solution of the disodium salt from 31.9 parts of 1-amino-8-naphthol-3:6-disulphonic acid in 250 parts of water. When coupling is complete the suspension of the monoazo compound so obtained is rendered nearly neutral to litmus by the addition of 40% aqueous caustic soda and 22 parts of anhydrous sodium carbonate are added. The resulting solution is cooled to 5°–7° C. with stirring and the solution of diazotised 4-amino-2-N-ethyl-omega-chloroacet-toluidide obtained as above slowly run in. When coupling is complete the coupling medium is neutralised to litmus by addition of 2N hydrochloric acid and the mixture heated to 60°–65° C. The new disazo dyestuff is precipitated by the addition of sodium chloride (10% weight volume), filtered off, washed with 10% sodium chloride solution and dried.

The new dyestuff forms a violet-black powder which dissolves in water with a blue colouration and in concentrated sulphuric acid with a dull bluish-green colouration. It dyes wool from a dyebath containing sulphuric acid and Glauber's salt in blue-black shades, the dyeings having very good fastness to severe washing and sulphur stoving, and good fastness to milling, potting, perspiration and light.

If in the above recipe 17.3 parts of o-chloro-p-nitroaniline are used in place of the p-nitroaniline there is obtained a dyestuff having similar properties and yielding blue-black shades on wool.

Example 2

26.7 parts of 4-amino-1-N-cyclohexyl-omega-chloro-acetanilide are dissolved in 300 parts of water and 25 parts of 36% hydrochloric acid and diazotised at 15°–30° C. by the addition of a solution of 6.9 parts of sodium nitrite in 50 parts of water.

The solution of the diazo compound, after filtration if necessary, is cooled to 5°–7° C. and added with stirring to a similarly cooled aqueous solution of the sodium salt of the monoazo compound obtained as described in Example 1 by diazotising and coupling 13.8 parts of p-nitroaniline with 31.9 parts of 1-amino-8-naphthol-3:6-disulphonic acid in acid medium and adding 22 parts of anhydrous sodium carbonate. Coupling is rapid, and, when complete, the aqueous medium is neutralised to litmus by adding 2N-hydrochloric acid and the mixture heated to 60°–65° C. The new disazo dyestuff is precipitated by the addition of sodium chloride (approximately 5% weight/volume), filtered off, washed with 10% brine and dried. It dyes wool from a dyebath containing sulphuric acid and Glauber's salt in blue-black shades, the dyeings having very good fastness to severe washing, milling and sulphur stoving, and good fastness to potting, perspiration and light.

By replacing the 4-amino-1-N-cyclohexyl-omega-chloroacetanilide used above by 28.1 parts of 4-amino-1-N-cyclohexyl-β-chloropropionanilide a dyestuff is obtained which dyes wool in blue-black shades of very good fastness to severe washing and sulphur stoving.

Example 3

13.8 parts p-nitroaniline are diazotised and coupled with 31.9 parts of 1-amino-8-naphthol-3:6-disulphonic acid in acid medium as described in Example 1, and the monoazo compound taken into solution by gradual addition of 40% aqueous caustic soda till neutral to litmus, followed by the addition of 21 parts of anhydrous sodium carbonate.

28.9 parts of 4-amino-2-N-benzyl-omega-chloro-acet-toluidide are diazotised by dissolving in 400 parts of water and 25 parts of 36% hydrochloric acid and adding a solution of 6.9 parts of sodium nitrite in 50 parts of water (temp. 5–10° C.). The solution of the diazo compound, after filtration if necessary, is added at 5–7° C. to the above alkaline solution of monoazo compound with good stirring. Coupling is rapid and when complete the mixture is neutralised to litmus by the addition of 2N-hydrochloric acid and heated to 60–65° C. 5% (weight for volume) aqueous sodium chloride is added. The new disazo dyestuff is then filtered off, washed with 10% sodium chloride solution and dried.

The new dyestuff forms a violet black powder which dissolves in water with a dull blue colouration and in concentrated sulphuric acid to a dull bluish green solution. It dyes wool from a dyebath containing sulphuric acid and Glauber's salt in blue-black shades, the dyeings having very good fastness to severe washing, milling and sulphur stoving, and good fastness to potting, perspiration and light.

Example 4

A solution of the sodium salt derived from 23.9 parts of 1-amino-8-naphthol-4-sulphonic acid in 400 parts of water is added in ½ hour with good stirring to the diazo solution obtained by adding 6.9 parts of sodium nitrite to a stirred mixture of 15 parts of p-aminoacetanilide, 320 parts of water and 31 parts of 36% hydrochloric acid at 3–7° C. A solution of 30 parts of crystalline sodium acetate in 60 parts of water is then added and the mixture stirred at 8–12° C. until coupling is complete. The mixture is made neutral to litmus by adding 40% caustic soda solution. There are then added 40 parts of anhydrous sodium carbonate and sufficient ice to cool the solution to 5° C. The solution obtained by diazotising 21.2 parts of 4-amino-1-N-ethyl-omega-chloroacetanilide in a mixture of 240 parts of water and 25 parts of 36% hydrochloric acid at 10° C. with 6.9 parts of sodium nitrite is then added to the solution of the monoazo compound and the mixture is stirred until coupling is complete. The coupling medium is almost neutralised to litmus by the addition of 2N-hydrochloric acid and after heating the mixture to 70–75° C., 40 parts of sodium chloride are added to precipitate the new disazo dyestuff which is filtered off and dried.

The dyestuff forms a violet-black powder which dissolves in water with a blue colouration and in concentrated sulphuric acid with a bluish-green colouration. It dyes wool from a dyebath containing sulphuric acid and Glauber's salt in blue black shades, the dyeings having very good fastness to severe washing and sulphur stoving and good fastness to milling and potting.

*Example 5*

13.8 parts of p-nitroaniline are diazotised as described in Example 1 and to the diazo solution is added with good stirring a solution in 400 parts of water of the sodium salt derived from 23.9 parts of 1-amino-8-naphthol-4-sulphonic acid. When coupling is complete 40% caustic soda solution is added to the suspension of the monoazo compound until it is nearly neutral to litmus. Then a solution of 31 parts of anhydrous sodium carbonate in 80 parts of water is added. The resulting solution is cooled to 5–7° C. with stirring and a solution obtained by diazotising 21.2 parts of 4-amino-1-N-ethyl-omega-chloroacetanilide in a mixture of 240 parts of water and 25 parts of 36% hydrochloric acid at 10° C. with 6.9 parts of sodium nitrite is added. The coupling is rapidly complete and the mixture is then almost neutralised to litmus by the addition of 2N-hydrochloric acid and heated to 60° C. The new dyestuff is filtered off, washed with 2% sodium chloride solution and dried. It forms a bronzy black powder which dissolves in water with a reddish blue colouration and in concentrated sulphuric acid with a greenish blue colouration. When applied to wool from a dyebath containing sulphuric acid and Glauber's salt it gives dark navy shades, the dyeings having very good fastness to severe washing and sulphur stoving and good fastness to potting.

If the 4-amino-1-N-ethyl-omega-chloroacetanilide employed above is replaced by 22.7 parts of 4-amino-2-N-ethyl-omega-chloroacet-toluidide there is obtained a dyestuff having similar dyeing and fastness properties.

*Example 6*

13.8 parts of p-nitroaniline are diazotised in 700 parts of water and 30 parts of 36% hydrochloric acid by the addition of 6.9 parts of sodium nitrite and to the diazo solution so-formed is added with good stirring a solution in 250 parts of water of the disodium salt derived from 31.9 parts of 1-amino-8-naphthol-4:6-disulphonic acid. When coupling is complete, sufficient 40% caustic soda solution is added to make the mixture almost neutral to litmus, followed by 22 parts of anhydrous sodium carbonate. After cooling to 5–7° C., there is added with stirring a diazo solution obtained as described in Example 2 from 26.7 parts of 4-amino-1-N-cyclohexyl-omega-chloroacetanilide. When coupling is complete the aqueous medium is neutralised to litmus by the addition of 2N-hydrochloric acid and the mixture is heated to 55–60° C. The new dyestuff is precipitated by the addition of sodium chloride (2% weight/volume), filtered off, washed with 2½% sodium chloride solution and dried. It dyes wool in heavy navy shades from a dyebath containing sulphuric acid and Glauber's salt, the dyeings having very good fastness to severe washing, milling and potting and good fastness to perspiration and light.

*Example 7*

22.7 parts of 4-amino-1-N-ethyl-β-chloropropionanilide are dissolved in a mixture of 320 parts of water and 25 parts of 36% hydrochloric acid and diazotised at 10° C. by the addition of 6.9 parts of sodium nitrite. 13.8 parts of m-nitroaniline are dissolved in a mixture of 200 parts of water and 28 parts of 36% hydrochloric acid, and diazotised at 5° C. by the addition of 6.9 parts of sodium nitrite. The diazo solution so formed is diluted with 600 parts of water at 5–7° C. and to the stirred mixture is added during 1 hour a neutral solution of the disodium salt derived from 31.9 parts of 1-amino-8-naphthol-3:6-disulphonic acid in 240 parts of water. When the formation of the monoazo compound is complete the mixture is almost neutralised to litmus by the addition of 40% caustic soda solution, then cooled to 8° C. and a solution of 22 parts of anhydrous sodium carbonate in 60 parts of water added, followed by the solution of diazotised 4-amino-1-N-ethyl-β-chloropropionanilide prepared as described above. Coupling is rapid and when complete, the mixture is heated to 80° C. and sodium chloride (12.5% weight/volume) is added to precipitate the new disazo dyestuff. The latter is filtered off, washed with 15% brine and dried. It forms a black powder which dissolves in water to give blue solutions and in concentrated sulphuric acid to give green solutions. The new dyestuff dyes wool from a dye-bath containing sulphuric acid and Glauber's salt in heavy navy shades, the dyeings having good fastness to severe washing, sulphur stoving, milling, perspiration and light.

*Example 8*

24.1 parts of 4-amino-2-N-ethyl-β-chloropropion-toluidide are dissolved in a mixture of 360 parts of water and 25 parts of 36% hydrochloric acid and diazotised at 10° C. by the addition of 6.9 parts of sodium nitrite. To this diazo solution is added during 1 hour with stirring a neutral solution of the disodium salt from 31.9 parts of 1-amino-8-naphthol-3:6-disulphonic acid in 250 parts of water. After stirring the coupling mixture for 18 hours at 10° C., 10% aqueous sodium acetate solution is added until acidity to Congo red disappears and stirring is continued until coupling is complete. The aqueous medium is then almost neutralised to litmus by adding 40% caustic soda solution. 56 parts of anhydrous sodium carbonate dissolved in 120 parts of water are added. To the resulting solution of monoazo compound at 8° C. is now added a solution obtained by diazotising 26.7 parts of 4-amino-1-N-cyclohexyl-omega - chloroacetanilide as described in Example 2 except that double the quantity of hydrochloric acid is used (i. e., 50 parts of 36% hydrochloric acid). After 2 hours stirring the mixture is heated to 65°–70° C. and 10% weight/volume of sodium chloride added. The new dyestuff which separates is filtered off and dried. It dyes wool from a dyebath containing sulphuric acid and Glauber's salt in navy shades, the dyeings having very good fastness to severe washing and sulphur stoving and good fastness to milling, potting and perspiration.

The invention is further illustrated by the examples listed in the following table where A, Z and A' have the meanings already indicated.

| Example No. | Components | | | Shade given by dyestuff on wool |
|---|---|---|---|---|
| | A | Z | A' | |
| 9 | p-Nitroaniline | 1-Amino-8-naphthol-3:6-disulphonic acid. | 4-Amino-1-N-ethyl-omega-chloroacetanilide. | Blue-black. |
| 10 | o-Chloro-p-nitroaniline | do | do | Black. |
| 11 | p-Amino-acetanilide | 1-Amino-8-naphthol-4-sulphonic acid | 4-Amino-2-N-ethyl-omega-chloroacettoluidide. | Blue-black. |
| 12 | do | do | 4-Amino-1-N-ethyl-β-chloropropionanilide. | Do. |
| 13 | 4-Amino-1-N-ethylacetanilide. | 1-Amino-8-naphthol-3:6-disulphonic acid. | 4-Amino-1-N-cyclohexyl-omega-chloroacetanilide. | Navy. |
| 14 | p-Nitroaniline | 1-Amino-8-naphthol-4:6-disulphonic acid. | 4-Amino-2-N-ethyl-omega-chloroacettoluidide. | Blue-black. |
| 15 | 4-Nitro-2-toluidine | 1-Amino-8-naphthol-3:6-disulphonic acid. | 4-Amino-1-N-sec-butyl-omega-chloroacetanilide. | Bronzy-black. |
| 16 | 5-Nitro-2-anisidine | do | 4-Amino-2-N-ethyl-β-bromo-propiontoluidide. | Very reddish black. |
| 17 | p-Nitroaniline | do | 4-Amino-1-N-phenyl-omega-chloroacetanilide. | Black. |
| 18 | o-Nitroaniline | do | 4-Amino-1-N-cyclohexyl-β-chloropropionanilide. | Do. |
| 19 | do | do | 4-Amino-2-N-ethyl-β-bromopropiontoluidide. | Do. |
| 20 | m-Nitroaniline | do | 4-Amino-2-N-ethyl-β-chloropropiontoluidide. | Do. |
| 21 | p-Nitroaniline | 1-Amino-8-naphthol-4-sulphonic acid | 4-Amino-1-N-β-ethoxyethyl-omega-chloroacetanilide. | Bluish black. |
| 22 | 5-Nitro-1-naphthylamine | 1-Amino-8-naphthol-3:6-disulphonic acid. | 3-Amino-1-N-benzyl-omega-chloroacetanilide. | Reddish black. |
| 23 | p-Nitroaniline | 1-Amino-8-naphthol-6-sulphonic acid | 4-Amino-1-N-isopropyl-omega-chloroacetanilide. | Dull reddish black. |
| 24 | 4-Amino-1-N-ethylacetanilide. | 1-Amino-8-naphthol-4-sulphonic acid | 3-Amino-omega-chloroacetanilide-4-sulphonic acid. | Reddish black. |
| 25 | 4-Amino-1-N-cyclohexyl-omega-chloroacetanilide. | 1-Amino-8-naphthol-3:6-disulphonic acid. | 4-Amino-1-N-ethyl-β-chloropropiontoluidide. | Navy. |
| 26 | 4-Amino-omega-chloropropionanilide. | 1-Amino-8-naphthol-4-sulphonic acid | 4-Amino-1-N-ethyl-omega-chloroacetanilide. | Dark navy. |
| 27 | p-Nitroaniline | 1-Amino-8-naphthol-4:6-disulphonic acid. | 4-Amino-1-N-ethyl-β-chloropropionanilide. | Black. |
| 28 | do | do | 4-Amino-1-N-cyclophexyl-β-chloropropionanilide. | Do. |
| 29 | m-Nitroaniline | 1-Amino-8-naphthol-4:6-disulphonic acid. | 4-Amino-1-N-cyclohexyl-β-chloropropionanilide. | Dark navy. |
| 30 | do | 1-Amino-8-naphthol-4:6-disulphonic acid. | 4-Amino-2-N-ethyl-omega-chloroacettoluidide. | Black. |
| 31 | do | do | 4-Amino-1-N-ethyl-β-chloropropionanilide. | Do. |
| 32 | do | 1-Amino-8-naphthol-3:6-disulphonic acid. | 4-Amino-2-N-ethyl-β-bromopropiontoluidide. | Do. |

We claim:

The disazo dye which in the form of its acid is represented by the formula

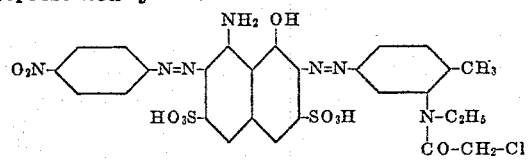

ARTHUR HOWARD KNIGHT.
WILLIAM ELLIOT STEPHEN.

REFERENCES CITED

The following references are of record in the file of this patent:

FOREIGN PATENTS

| Number | Country | Date |
|---|---|---|
| 615,799 | Germany | Oct. 10, 1929 |
| 616,620 | Germany | May 23, 1931 |
| 450,564 | Great Britain | July 21, 1936 |